(12) United States Patent
Sögtrop

(10) Patent No.: US 8,892,532 B2
(45) Date of Patent: Nov. 18, 2014

(54) DOCUMENT MANAGEMENT WITH VERIFIABLE TIME-OF-ARCHIVE CAPABILITY

(75) Inventor: Michael Sögtrop, Poing (DE)

(73) Assignee: LSI Corporation, Milpitas, CA (US)

( * ) Notice: Subject to any disclaimer, the term of this patent is extended or adjusted under 35 U.S.C. 154(b) by 1151 days.

(21) Appl. No.: 11/567,362

(22) Filed: Dec. 6, 2006

(65) Prior Publication Data

US 2008/0141365 A1 Jun. 12, 2008

(51) Int. Cl.
*G06F 7/00* (2006.01)
*G06F 17/00* (2006.01)
*G06F 17/30* (2006.01)

(52) U.S. Cl.
CPC ................................. *G06F 17/30011* (2013.01)
USPC ............................. 707/698; 707/661; 707/821

(58) Field of Classification Search
CPC ...................... G06F 17/30067; G06F 17/30097
USPC ......... 707/200, 201, 203, 204, 205, 8, 1, 100, 707/102, 661, 672, 687, 698, 999.2, 707/999.204, 812, 821; 711/100, 167; 726/21; 715/200
See application file for complete search history.

(56) References Cited

U.S. PATENT DOCUMENTS

| | | | |
|---|---|---|---|
| 5,742,807 A * | 4/1998 | Masinter ....................... | 707/610 |
| 6,662,198 B2 * | 12/2003 | Satyanarayanan et al. ... | 707/204 |
| 6,917,948 B2 * | 7/2005 | Campbell ................... | 707/104.1 |
| 2002/0055942 A1 * | 5/2002 | Reynolds ....................... | 707/200 |
| 2002/0194209 A1 * | 12/2002 | Bolosky et al. ............... | 707/205 |
| 2004/0220975 A1 * | 11/2004 | Carpentier et al. ........... | 707/200 |
| 2005/0234908 A1 * | 10/2005 | Lowrance et al. ................ | 707/8 |
| 2008/0104408 A1 * | 5/2008 | Mayer ........................... | 713/178 |

OTHER PUBLICATIONS

Jamaluddin et al., Data Time Stamping With Digital Signatures Infracture, Research & Development, 2002, SCOReD 2002, Student Conference, Jul. 16-17, 2002, pp. 102-104, Digital Object Identifier: 10.1109/SCORED.2002.10330667.*

* cited by examiner

*Primary Examiner* — Greta Robinson
(74) *Attorney, Agent, or Firm* — Daniel J Santos; Smith Risley Tempel Santos LLC

(57) ABSTRACT

A document archiving and retrieval system enables third parties to verify that an electronic document had been archived on a particular date and time. For each document to be archived, a hash function generates a digital fingerprint of the document, and inserts it into a hash list file, together with an indicator of the location of the file in the archive. The hash list file is submitted to an electronic time stamping authority to obtain a corresponding digital time stamp. Upon request, authentication of the hash list file with the digital time stamp, and verification that the current hash of the file matches that in the hash list file proves that the document was archived on the date indicated by the digital time stamp, and had not subsequently been altered.

16 Claims, 13 Drawing Sheets

DOCUMENT MANAGEMENT WITH VERIFIABLE TIME-OF-ARCHIVE CAPABILITY

FIELD OF THE INVENTION

The present invention relates generally to document management. More particularly, the instant invention discloses a method for ensuring that a particular electronic document existed at a known time in the past.

BACKGROUND OF THE INVENTION

Situations arise when it is desirable to know that a document existed on or before a certain date. For example, in the field of research and development, it may be desirable to know when a document existed to firmly establish who was first in the race to be the inventor, and approximately when the invention had been made. This may be particularly true for scanned paper documents.

One of the most common means for determining when an electronic document has been created is to look at the date/time stamp of the document as set by the operating system. In the large majority of cases, where trust is not an issue, this date/time stamp is sufficient to date the document. However, the date/time stamp provided by the operating system can be easily modified, and so may be deemed unsatisfactory by an untrusting but interested party.

One method used to verify and establish the dating of an electronic document is to give the other party full access to the server that contains the document, and to research the evolution of ideas and other documents that led up to the document in question. For example, in the field of software, with great patience and an enormous amount of time, it is possible for another party to determine the evolution of a piece of software as it goes through numerous coding and debugging cycles (the results of which are typically not deleted from the server), and thus establish with a fair amount of confidence that the version of the software in question did indeed exist on a certain date. However, giving another party access to a server is a risky undertaking, which many companies and individuals are uneasy to do. To ensure that other trade secrets on the server are not compromised during the search, careful surveillance is required. As the process can be quite time-consuming, this surveillance can quickly become expensive and burdensome.

As an alternative, trusted escrow services exist that will archive copies of documents, and vouch for the dates and times at which the documents were submitted. This is a considerable improvement over granting a potentially hostile party access to a server, and determining the submission date and time of the document is basically automatic, being provided by the escrow service. However, a company or person can never know in advance which documents will be critical, for which the creation date of the document will become an issue, and which documents will not. Of course, the vast majority of documents will never be of critical importance. However, to make certain that when the day comes a document can be produced and dated on demand, all potential documents must be submitted to the escrow service. As escrow services typically charge by the number of documents submitted, and by the number of updates, costs can quickly grow.

It would therefore be desirable to have a method that would quickly, easily and cheaply enable a third party to establish with credible certainty that a host of electronic documents existed on a certain date and time.

SUMMARY OF THE INVENTION

One aspect of the invention provides a document management method. In one embodiment, a first hash function is used to obtain a plurality of hash results for a corresponding plurality of electronic documents. A hash list file including these hash results is then created, and submitted to an electronic time stamping authority to obtain a digital time stamp. The hash list file, the digital time stamp and the electronic documents are then archived. In a later verification step to prove the existence of an electronic document on the date indicated by the digital time stamp, the digital time stamp is used to authenticate the hash list file. Then, the first hash function is used to obtain a verification hash result, which is compared against the corresponding hash result in the hash list file. Identity of these verification hash results proves that the electronic document had not been modified since submission of the original hash list file to the electronic time stamping authority, and was in existence by at least the time indicated by the digital time stamp.

In one embodiment, the verification hash results in the hash list file are correlated to the archived files by using file locators in the hash list file. In another embodiment, a hash of the file locators is used in the hash list file to avoid disclosure of the file locators to the electronic time stamping authority. In yet another embodiment, a hash of the hash list file is submitted to the electronic time stamping authority to obtain the digital time stamp, rather than submitting the hash list file itself.

Another aspect of the invention provides a document management system that performs archiving and time-stamp verification of files. The system includes a hash engine, an archiving system, an authentication system and a verification system. The archiving system is capable of storing a plurality of electronic documents, and utilizes the hash engine to generate a hash list file having a plurality of hash results corresponding to the electronic documents. In certain embodiments, the archiving system also obtains a digital time stamp of the hash list file from an electronic time stamping authority. The authentication system utilizes the digital time stamp to authenticate the hash list file and determine the existence of the hash list file at a known time. The verification system utilizes the hash engine to obtain a verification hash result of an electronic document, and compares the verification hash result to a corresponding hash result in the hash list file.

DETAILED DESCRIPTION

Figure 1:
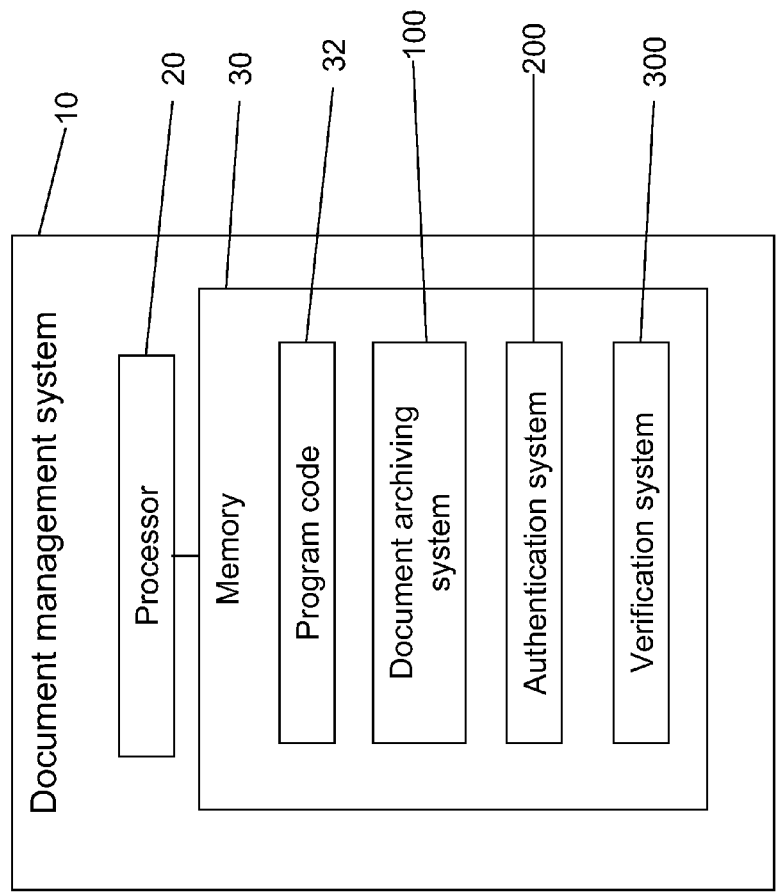
FIG. 1 is a block diagram of an embodiment document management system.

In the following, the term "time" is broadly meant to include both dates and times, and may include any suitable encoding scheme that permits extraction of a solar or sidereal time (such as UTC or the like), a date or both. A digital time stamp is a section of digital information that includes a time. This time may be the time at which the stamp was issued, when an electronic document was submitted for stamping, or the like. A digital time stamp is generally embedded in, stored with, or otherwise referenced to, the electronic document that is to be electronically time stamped, and typically contains a digital "fingerprint" that uniquely identifies the electronic document that was time stamped. When the contents of an electronically time stamped document are changed, the digital fingerprint of the document correspondingly changes, and will thus no longer match the fingerprint held in the digital time stamp. Electronic documents that have been edited after time stamping can thus be detected.

Electronic time stamping authorities currently exist that will accept an electronic document and return a digital time stamp for the document, which records the date and solar time (that is, the time) of submission of the document. Particular examples of such systems include the United States Postal Service Electronic Postmark™ service, and the e-TimeStamp® service from DigiStamp, Inc., each of which is an example of a trusted electronic time stamping authority. Trusted electronic time stamping authorities provide a digital time stamp that is highly accurate in terms of the time it records, and highly tamper-resistant, insofar as any modification of the digital time stamp, or the time-stamped document, can be easily detected. Such a digital time stamp may be called a secure digital time stamp. The accuracy and security of a secure digital time stamp provides sufficient assurance to interested third parties that the electronic document did indeed exist at the time indicated by the digital time stamp, and can even amount to a legal conclusion of such existence. Although certain embodiments in the following indicate usage of a trusted time stamping authority to digitally time stamp an electronic document, it should be understood that the invention may utilize any suitable time stamping authority. A trusted electronic time stamping authority may be desirable because of the legal assurance such a service provides, but it is not a necessity of the instant invention. For purposes of the instant invention, as between two interested parties A and B, so long as each agrees that a time stamping authority C provides a true and accurate time stamp for a submitted electronic document, then the time stamping authority C is suitable for the following, regardless of whether or not the time stamping service C is a trusted electronic time stamping authority. Indeed, the time stamping authority C may even be one of the interested parties A or B. For example, A may submit an electronic document to B to obtain a digital time stamp of the document so as to prove to B at a later date that the document existed on the time indicated by the digital time stamp issued by B.

With reference to FIG. 1, an embodiment document management system 10 includes a processor 20 and memory 30. The memory 30 may include operational memory for the processor 20, such as RAM, but as known in the art, may also include virtual memory present in physical storage, such as a hard disk, or in resources accessed through a network connection. Indeed, it should be understood that the document management system 10 is not limited to residing on a single computer, but may itself be configured as a networked application active and accessible on a multitude of networked computers and storage devices. The design and management of such networked applications is a topic that is beyond the scope of this disclosure, but is well known in the art of programming. The memory 30 includes program code 32 that controls the operations of the processor 20, and which implements aspects of the invention system and underlying methods. In particular, the program code 32, together with underlying hardware resources, provides a document archiving system 100, an authentication system 200 and a verification system 300. The computer code 32 may be installed into the memory 32 from another computer-readable media that contains the software to implement the document management system 10, as known in the art. Designing the program code 32 should be well within the means of one of reasonable skill in the art, after reading the following disclosure.

With further reference to FIGS. 2-5, the document archiving system 100 includes a hash list file creation system 110 that utilizes a database 120 and a verification hash engine 130 to create a hash list file 150. The database 120 includes a plurality of electronic document files 121, 123, 125 that are to be archived. The files 121, 123, 125 may be original electronic documents, or may be copies of electronic documents as they exist at a certain time, such as when they are copied from the originals and processed by the document archiving system 100. If the files 121, 123, 125 are copies of originals, it will be understood that the originals may subsequently be modified, and the document archiving system 100 will thus store "snapshots," in the form of the files 121, 123, 125, of what the originals looked like at a particular time. Alternatively, some document management systems permit a single document to go through a multitude of versions; each of these versions is archived, and any attempted change to such an archived version simply yields a new file with new version information. Each of these document versions may be thought of as an "original," but because the document management system will not permit these versions to be subsequently changed, they may also be sufficient to serve as archive files 121, 123, 125 for purposes of the instant invention. The database 120 may reside anywhere in the memory 30, and as the memory 30 can include network resources, the database 120 could be spread out across multiple computers or storage systems on a network. The design of such file databases 120 is well within the means of one having ordinary skill in the art. The database 120 could be, for example, a file system as provided by an operating system (OS), or part of a more complicated document management and retention application running under an OS, such as a version control system. Each file 121, 123, 125 may have an associated location indicator 122, 124, 126 which indicates where in the memory 30 the file 121, 123, 125 is located. The location indicators 122, 124, 126 may be, for example, the pathname of the file 121, 123, 125, a URL (uniform resource locator), or the like. Additionally, each file location indicator 122, 124, 126 may further include additional information specific to the file 121, 123, 125, such as version information, file tracking and control information, or the like.

The verification hash engine 130 may be implemented by any means known in the art, and typically will be implemented as a subroutine within the program code 32. The verification hash engine 130 accepts as input an electronic document, such as one of the files 121, 123, 125 and provides as output a hash result of the electronic document. As an aside, it should be clear that any sort of electronic document may be hashed by the verification hash engine 130; the type and format of the electronic document is unimportant for purposes of the verification hash engine 130, which simply treats the electronic document as a collection of digital data to be hashed. This hash result is preferably from a cryptographic hash function, as known in the art, such as SHA-1, MD5 or the like, and is typically a fixed-length number. However, other hash functions, or file identification functions, may also be used.

Use of a cryptographic hash function may be expressed as h=f(n), where f( ) is the hash function, n is the electronic document that is input into the hash function, and h is the hash result output by the hash function. The cryptographic hash function f( ) is preferably pre-image resistant, second pre-image resistant and collision resistant. Pre-image resistance indicates that for a given hash value h, it should be effectively impossible to find an electronic document m such that f(m)=h. Second pre-image resistance indicates that for a given first electronic document m, it should be effectively impossible to create a different second electronic document n such that f(n)=f(m). Finally, collision resistance indicates that it should be effectively impossible to create two different electronic documents m and n such that f(n)=f(m). An electronic document m may be considered different from another electronic document n if the contents of m are not identical to the contents of n.

Given the rapid advances in computing technologies, the term "effectively impossible" is a moving target. What was considered impossible to do ten years ago may now be commonplace. Generally, "effectively impossible" is intended to indicate that the computational power required to break any of the resistance capabilities of the cryptographic hash function f( ) under current technological standards would be prohibitively expensive in terms of time, money or both. In practice, it may be found that ideal cryptographic hash functions do not exist. One of reasonable skill in the art will therefore readily recognize that any suitable hashing function, the suitability of which may be determined with reference to the following disclosure, may be utilized to implement the verification hash engine 130. If a cryptographic hash function is selected for use within the verification hash engine 130, then preferably the verification hash engine 130 utilizes a hash function in which the odds of a hashing collision (in which f(n)=f(m) when n≠m) are exceedingly remote. More preferably still, the verification hash engine 130 uses a widely known and accepted cryptographic hashing function, such as MD5, SHA-1 or the like, to ensure trust within the document archiving system 100.

Because of the properties of a cryptographic hash function f(n), if there are any differences at all between two electronic documents n and m, the respective hash results of these two documents n, m will almost certainly be different. The verification hash engine 130 therefore may ideally produce a unique fingerprint of the input electronic document. Further, because of this unique fingerprinting characteristic, the existence of a hash code h may serve as proof of the existence of an electronic document m, when f(m)=h.

As an initial step 101, a user determines which files 121, 123, 125 within the database 120 are to be archived for time-stamping purposes. In an iterative loop 102, each of the selected files 121, 123, 125 is then processed through a hashing step 103 and an updating step 104. In the hashing step 103, each file 121, 123, 125 is passed through the verification hashing engine 130 to generate a series of respective hash results 140. In the updating step 104, each of the hash results 141, 143, 145 from the respective iteration is inserted into the hash list file 150, along with the location indicator 122, 124, 126 of the hashed file 121, 123, 125. The hash list file 150 is thereby built up that comprises a plurality of location entries 152, 154, 156, and a corresponding plurality of file hash results 151, 153, 155. Within the hash list file 150, the location entries 152, 154, 156 are correlated with the file hash results 151, 153, 155 in a respective manner by any suitable method known in the art, so that each location entry 152, 154, 156 indicates where within the database 120 the file 121, 123, 125 is located that gave rise to the respective file hash result 151, 153, 155. It should be understood that the location entries 152, 154, 156 are not necessarily required for the hash list file 150. Correlation of the file hash results 151, 153, 155 with their respective files 121, 123, 125, if desired, could be done by any other suitable means, such as by matching the order of the file hash results 151, 153, 155 within the hash list file 150 with the order of the files 121, 123, 125 within the database 120. This may be particularly true if the database 120 is merely a sub-section (such as a directory or sub-directory) of a much larger file system.

Once constructed, the hash list file 150 contains a list of digital fingerprints 151, 153, 155 of the electronic documents 121, 123, 125 being archived in the database 120, and subsequently undergoes a time-stamping step 105 to prove the existence of the hash list file 150 at a certain time. Ideally, this time-stamping step 105 is performed immediately after creation of the hash list file 150; however, exactly when the time-stamping step 105 is executed may be left up to the administrator of the document archiving system 100. By proving the existence of the hash list file 150 on a certain time, the time-stamping step 105 by extension also proves the existence of the fingerprinted files 121, 123, 125 whose file hash results 151, 153, 155 are present in the hash list file 150. In a specific embodiment, the time stamping step 105 yields a digital time stamp 160 that serves as a signature of the hash list file 150 by an electronic time stamping authority 50.

To perform the time-stamping step 105, the document archiving system 100 may submit the hash list file 150 to the electronic time stamping authority 50, and receives in return from the electronic time stamping authority 50 a digital time stamp 60 of the submitted hash list file 150. The document archiving system 100 may then store a duplicate digital time stamp 160 of the digital time stamp 60 in the database 120, along with the hash list file 150 and the archived electronic documents 121, 123, 125. The database 120 will thus store for archiving purposes the electronic documents 121, 123, 125, the hash list file 150 containing the digital fingerprints of the electronic documents 121, 123, 125, and a digital time stamp 160 that indicates a known and verified time at which the hash list file 150 existed, as determined by the electronic time stamping authority 50. It should be noted that although the digital time stamp 160 is shown as a separate document within the document archiving system 100, the digital time stamp 160 could actually be embedded within the hash list file 150, depending upon how the electronic time stamping authority 50 works. For example, in the USPS EPM™ system, the document archiving system 100 may e-mail the hash list file 150 to itself via the EPM™ system, which would embed the digital time stamp 160 into the hash list file 150. Such variations in time-stamping processes, however, should be clear to one of reasonable skill in the art, and do not substantially affect the methods and systems employed in the instant document management system 10. Also, it should be clear that it is not necessary that the digital time stamp 160, archive files 121, 123, 125 and hash list file 150 all be stored together in the same location. For example, the files 121, 123,

125 may be stored within one sub-section of the database 120, and the hash list file 150 and digital time stamp 160 may be stored in another sub-section of the database 120. Indeed, since the file hash results 151, 153, 155 within the hash list file 150 prove the existence of the archived files 121, 123, 125, it may not even be necessary to store the archived files 121, 123, 125, though it may be desirable to do so.

As indicated earlier, any suitable electronic time stamping authority 50 may be utilized, so long as the electronic time stamping authority 50 is trusted by any party potentially interested in the archive-times of the files 121, 123, 125, or which otherwise provides assurance of accurate document time-stamping, such as by providing a service recognized as a matter of law as assuring the existence of the time-stamped file in question. For illustrative purposes only, the electronic time stamping authority 50 is shown as a trusted service that provides a secure digital time stamp, and will be explained as such in the following. It will be appreciated, however, that numerous variations exist for digitally time stamping a document, securely or otherwise, and any such variation may be suitable for the purposes of the instant invention.

The document archiving system 100 may submit the hash list file 150 to the electronic time stamping authority 50 by any suitable method, such as through a network connection (as over the Internet). The electronic time stamping authority 50 has an authentication hash engine 51 which performs a cryptographic hash of the submitted hash list file 150 to create a corresponding document hash result that fingerprints the contents of the hash list file 150. The electronic time stamping authority 50 also has a secure date/time generator 52 that creates a trusted time value; the date/time generator 52 may, for example, be certified by the National Institute of Standards and Technology, in Gaithersburg, Md. The results of the authentication hash engine 51 and the date/time generator 52 are combined to form a stamp value 53. An encryption engine 54 encrypts the stamp value 53 using a private key 55 known only to the electronic time stamping authority 50. The electronic time stamping authority 50 then builds the digital time stamp 60 from the output of the encryption engine 54, as an encryption result 64, and, for the sake of convenience, a plain text version 62 of the hash result from the authentication hash engine 51 and the time value from the date/time generator 52. The plain text version 62 of the digital time stamp is not actually required for the digital time stamp 60, but is provided so that an interested user may view the time and signature information that is held within the digital time stamp 60. This plain text 62, which holds the hash value and submission time of the hash list file 150 could, theoretically, be easily modified; however, the digital time stamp 60 also contains the encrypted version 64 of this same information, and which is thus unreadable, and hence tamper-proof. The electronic time stamping authority 50 then sends the digital time stamp 60 to the document archiving system 100, which may subsequently save it as a digital time stamp 160 in the database 120.

The electronic documents 121, 123, 125 may thereafter be kept in the database 120 for archival purposes, if desired. The electronic documents 121, 123, 125 should not be modified, for any such modification would change their respective digital fingerprints, and hence destroy their identity with the digital fingerprints held in the hash list file 150. As indicated earlier, the electronic document files 121, 123, 125 may be the originals; however, the files 121, 123, 125 may also simply be "snapshots" in time of other documents that have since been modified, such as is the case in a version control system. At some later time, when an interested third party seeks proof that the archived electronic documents 121, 123, 125 were in existence by at least a specified date with specified contents, an authentication and verification process can be performed to prove the existence of the electronic documents 121, 123, 125 on at least the time indicated in the digital time stamp 160, and prove that the contents have not been changed.

To begin proving to an outside party that the electronic documents 121, 123, 125 existed at least by the date indicated in the digital time stamp 160, an authentication process is first performed to prove the authenticity of the digital time stamp 160 and associated hash list file 150 held within the database 120. Any suitable authentication process may be utilized to verify the authenticity of the digital time stamp 160 and related hash list file 150, which could even include, for example, a private agreement between the party holding the archived files 121, 123, 125 and an interested party desiring proof that the files 121, 123, 125 were in a particular state at the time indicated within the digital time stamp 160. Typically, however, the method used to verify the authenticity of the digital time stamp 160 with the hash list file 150 will depend upon the method used to obtain the digital time stamp 160. It should be noted that if the authenticity of the digital time stamp 160 as applied to the hash list file 150 is not in question, then this authentication process can be skipped, and instead the file verification process discussed below can be immediately performed. In the following, one embodiment authentication procedure is described that is consistent with the example time-stamping procedure described earlier. It should be understood, however, that other methods are certainly possible.

Figure 6:
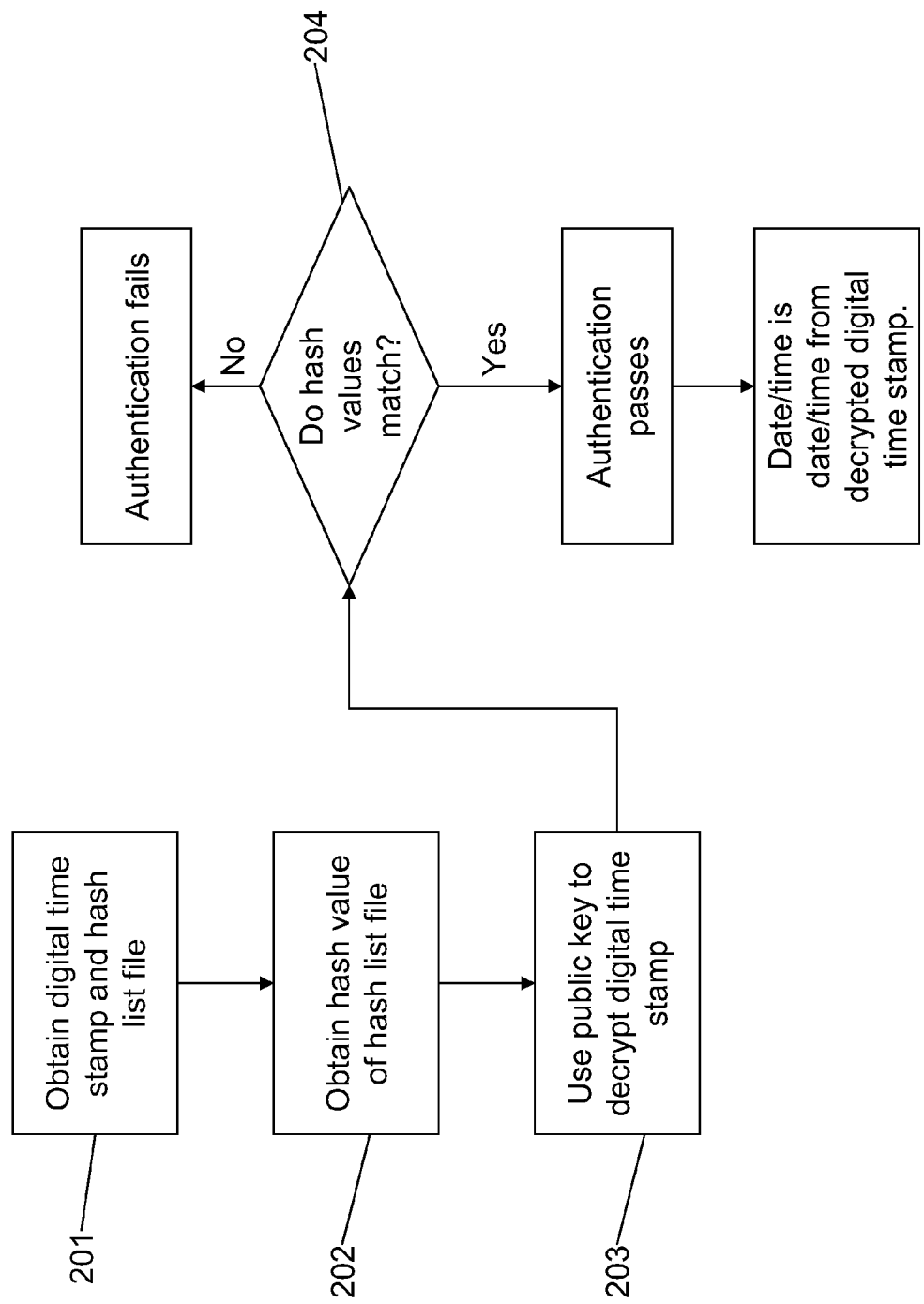
FIG. 6 is a flow chart of an embodiment hash list file authentication process.
Figure 7:
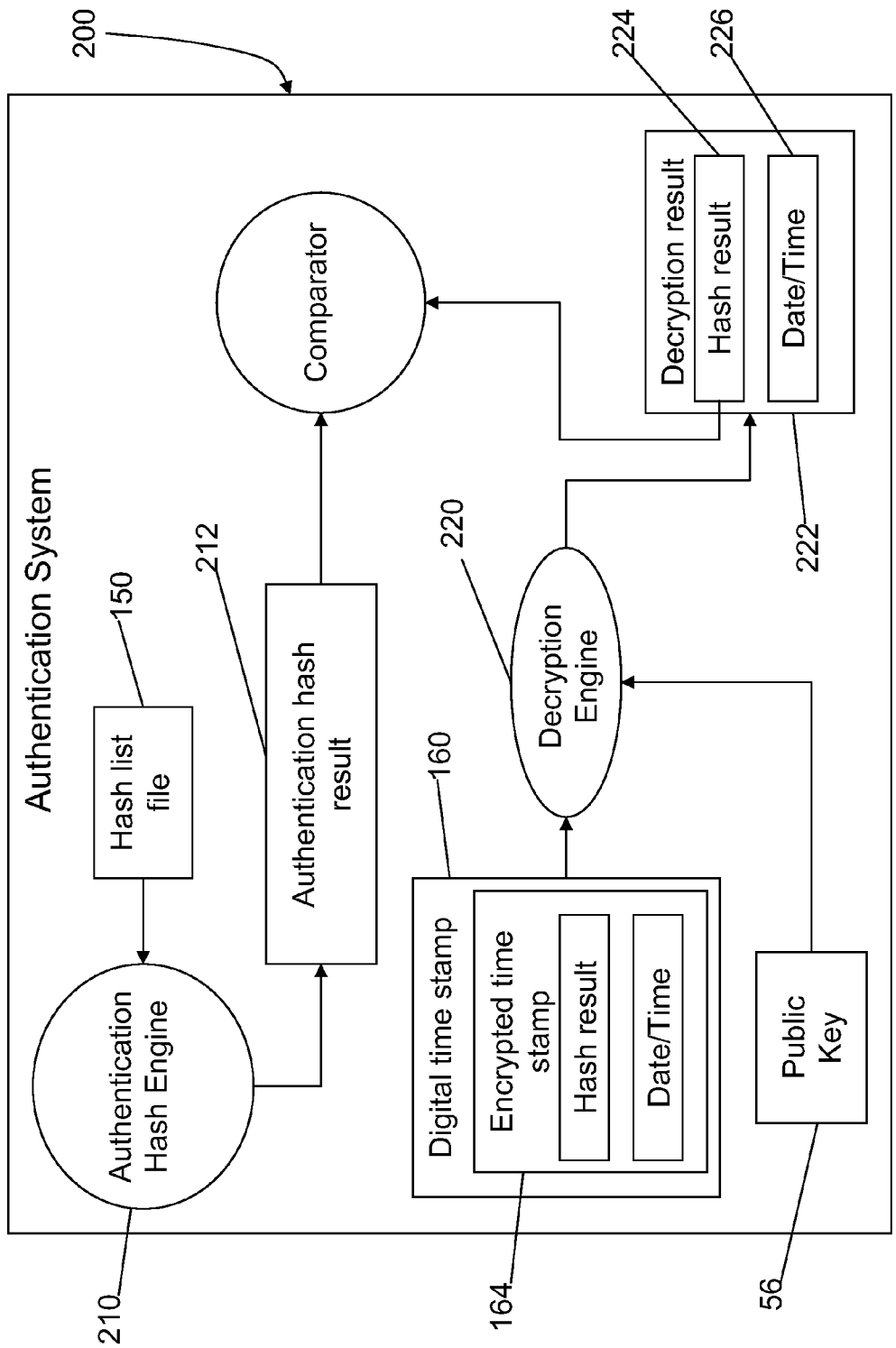
FIG. 7 illustrates an embodiment authentication system.

With further reference to FIGS. 6 and 7, the authentication system 200 begins with an extraction step 201, in which the hash list file 150 containing the digital fingerprints 151, 153, 155 of the electronic documents 121, 123, 125 in question is obtained from the database 120, along with the digital time stamp 160 of the hash list file 150. In an authentication hashing step 202, the authentication system 200 submits the hash list file 150 to an authentication hash engine 210 to obtain an authentication hash result 212. The authentication hash engine 210 should be functionally identical to the authentication hash engine 51 utilized by the electronic time stamping authority 50 to ensure identity of the file fingerprinting procedure used within the authentication system 200 and the electronic time stamping authority 50. That is, the hashing function used by the authentication hash engine 210 should be the same as that used by the time stamping authority 50, although the manner in which this authentication hashing function is performed may differ.

Next, a decryption process 203 is performed to decrypt the encrypted time stamp 164 within the digital time stamp 160. To ensure that the decryption engine 220 can successfully decrypt the encrypted time stamp 164, the authentication system 200 and the electronic time stamping authority 50 may utilize, for example, a public key ciphering system. As known in the art, public key ciphering methods enable a host to encrypt a file using a private key, and permits the public at large to decrypt the file using a public key. In this manner, the identity of the host is proved, as only the host can create a file that can be decrypted by the public key. Public keys are typically provided by a public key server (certificate authority); VeriSign® is an example of such a public key server. For the embodiment authentication system 200, the authentication system 200 obtains the public key 56 for the electronic time stamping authority 50 by any known method, and the decryption engine 220 utilizes this public key 56 to decrypt the encrypted time stamp 164 within the digital time stamp 160. The output of the decryption engine 220 is a decryption result 222 which contains, in readable form, a hash result 224 and a time 226. The hash result 224 is the hash result created by the authentication hash engine 51 in the electronic time stamping authority 50 when the hash list file 150 was submitted to the electronic time stamping authority 50; the time 226 is typically the time of submission, or issuance, of the digital time stamp 160.

In an authentication step 204, the authentication hash result 212 is compared to the decrypted hash result 224. If the two values are equal, then authentication of the hash list file 150 is proved. That is, identity of the hash values 212 and 224 prove to a known degree of certainty (as determined by the cryptographic qualities of the authentication hash functions) that the contents of the hash list file 150 as currently present in the database 120 are the same as when the hash list file 150 had been submitted to the electronic time stamping authority 50. For security purposes, the stamp time for the hash list file 150 is then taken from the decrypted time value 226, which may be considered the archive time of the hash list file 150. If, however, the hash values 212 and 224 do not match, then the authentication process fails. Failure of the authentication process may occur because the public key 56 is incorrect, because the electronic time stamping authority 50 did not actually issue the digital time stamp 160, because the contents of the encrypted time stamp 164 had been subsequently altered, or because the contents of the hash list file 150 had been altered after submission to the electronic time stamping authority 50. Regardless of the cause of authentication failure, the net effect is that the archival time of the electronic documents 121, 123, 125 cannot be proved.

Figure 8A:
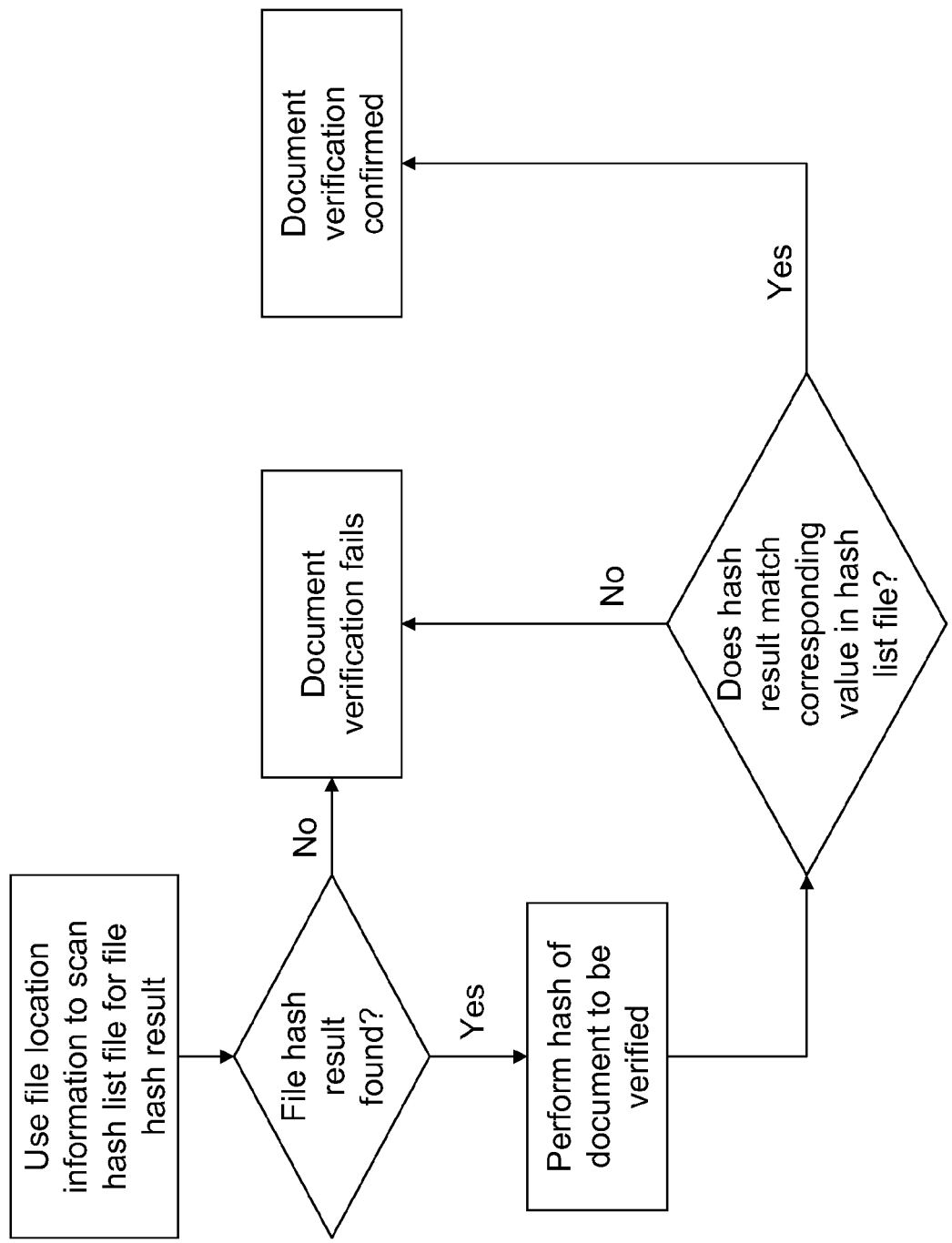
FIG. 8A is a flow chart of an embodiment electronic document archive-time verification process.
Figure 9:
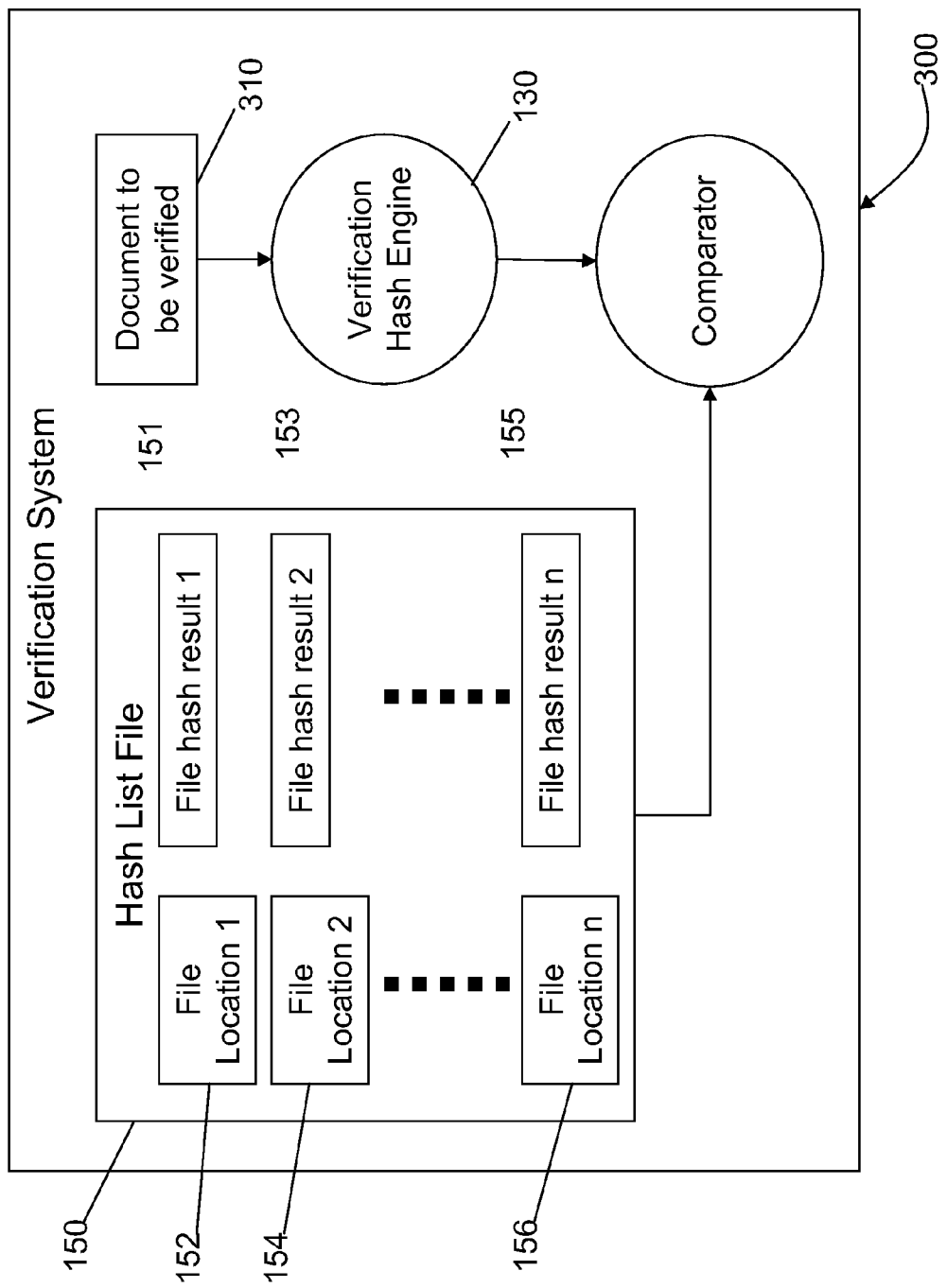
FIG. 9 illustrates an embodiment verification system.

With further reference to FIGS. 8A and 9, if the authentication procedure succeeds or is not required, then a verification procedure is performed by the verification system 300. An electronic document 310 to be verified is first selected by the verification system 300. The document 310 may be an electronic document 121, 123, 125 within the database 120, and may be one in which a third party has an interest. Alternatively, the electronic document to be verified 310 may be one provided by the interested party, and it is to be determined if this document 310 was in existence by at least the archive time in question as provided by the digital time stamp 160. The purpose of the verification procedure is to prove that the document 310 was in existence by at least the decrypted time value 226 of the digital time stamp 160, or the time value in the plaintext 162 if the authenticity of the time stamp 160 is not in question. Within the hash list file 150, authenticated by the authentication system 200 as being unaltered and validly time stamped, the file location entries 152, 154, 156 are scanned to determine if the document 310 has a corresponding file hash result entry 151, 153, 155. Of course, other suitable means known in the art may be utilized to determine if the hash list file 150 contains a file hash result entry 151, 153, 155 for the document to be verified 310. If a corresponding entry 151, 153, 155 is found in the hash list file 150, then the verification procedure may proceed. Otherwise, the verification procedure fails, and existence of the document 310 as of the archive time 226 cannot be proved. Use of file location entries 152, 154, 156 within the hash list file 150 may be desirable, however, to increase the cryptographic strength of the authentication system 200.

If proceeding, the verification system 300 utilizes the verification hash engine 130, which was earlier used by the archiving system 100, to perform a verification hash of the document 310. It should be noted, in light of the discussion of the authentication system 200, that the verification hash engine 130 need not implement the same hash function used by the authentication hash engine 210, although this is possible. Of course, the verification hash engine 130 should implement the same hash function that was used during the initial creation of the hash list file 150.

The result from the verification hash engine 130 is checked against the file hash entry 151, 153, 155 found in the hash list file 150 for the document 310. If these hash values match, then the verification procedure is considered a success; otherwise, the verification procedure fails. Verification success indicates that the document 310 was in existence by at least the time given in the archive time value 226, 162.

For example, suppose that the document 310 to be verified has a path name corresponding to that given in file location entry 154, and hence is electronic document 123. The verification system 300 will extract the corresponding verification hash result 153. The verification system 300 will then use the verification hash engine 130 to obtain a hash value for the electronic document 123, 310 and compare this hash value to the verification hash entry 153 from the hash list file 150. If these values match, the file verification procedure is considered a success, and the archival time 226, 162 of the document 310 is proved. This is because the authenticated digital time stamp 160 proved that the contents of the hash list file 150 were in existence on at least the archive time 226, 162. The verification hash result 153 in the hash list file 150 is a fingerprint of the electronic document 123 that was archived by at least the archive time 226, 162, and is determined by the contents of the file 123 when so archived. Identity of the hash value now with its value 153 when archived proves that the document 123 has not changed since being archived, and so was originally present at least since the archive time 226, 162.

Figure 8B:
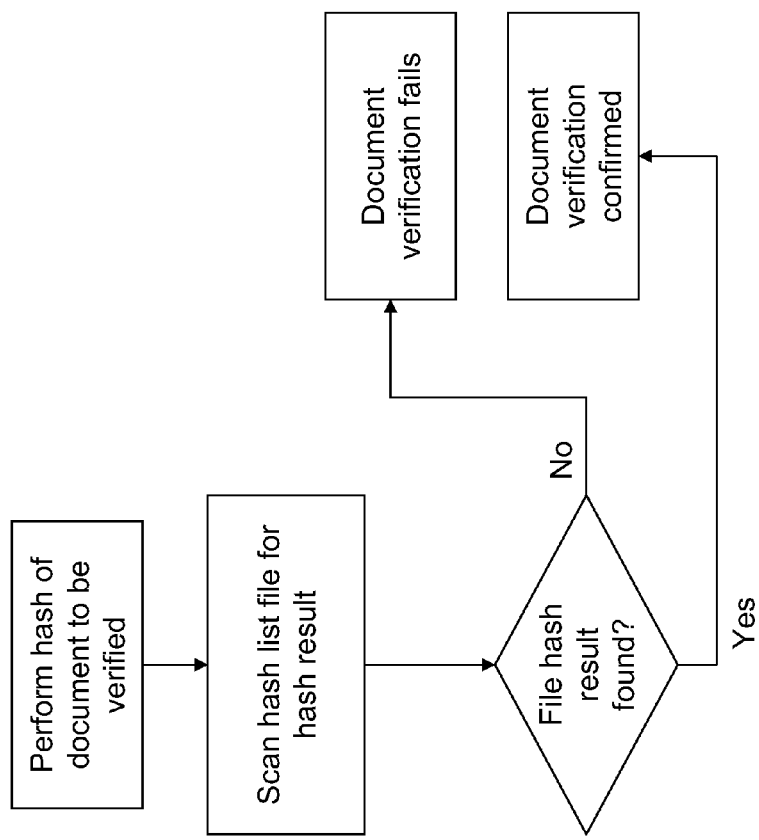
FIG. 8B is a flow chart of another embodiment electronic document archive-time verification process.

It will be appreciated that the verification system 300 may simply collapse the scanning and comparing steps into a single, iterative loop. With reference to an alternate embodiment verification procedure depicted in FIG. 8B, the verification system 300 may simply first obtain a verification result from the verification hash engine 130 for the document 310, and then check all file hash entries 151, 153, 155 in the hash list file 150 for a match against the result from the verification hash engine 130. If a match is found, then the verification procedure may be considered a success. Hence, it is not necessary to first check the file location entries 152, 154, 156 to find an archived file in the database 120 to verify against. The presence of the digital fingerprint provided by the file hash entries 151, 153, 155 is sufficient to prove the existence of a document 310 on the time indicated within the digital time stamp 160. Indeed, it will be appreciated that it is not necessary even for the electronic document 310 that is to be verified to exist within the database 120. The document to be verified 310 could be provided by another, interested, party, and the presence in the hash list file 150 of the "digital fingerprint" 151, 153, 155 of the document 310 is sufficient to prove that on the date in question, the document 310 had been submitted to the archiving system 100.

Figure 10:
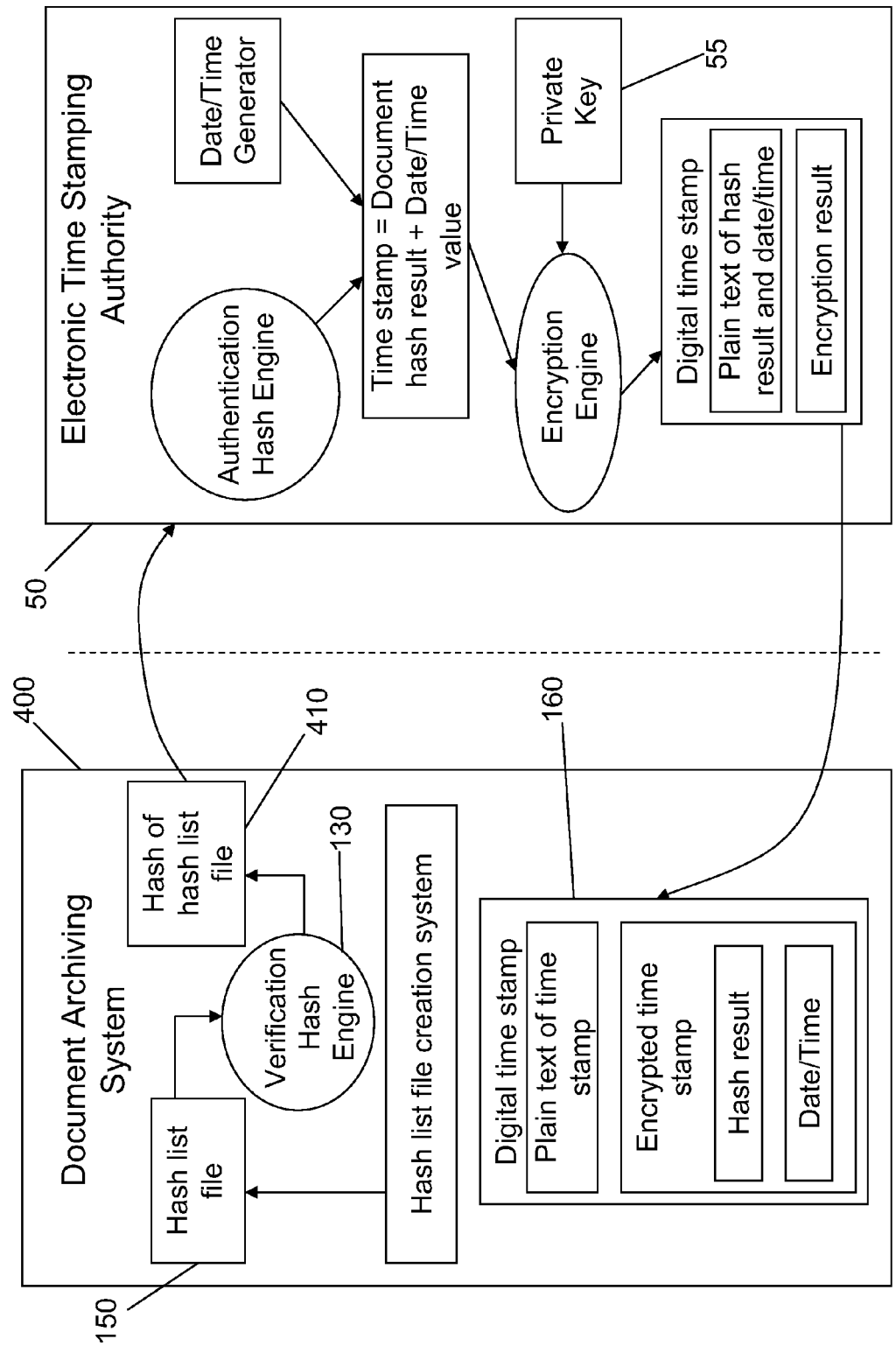
FIG. 10 illustrates another embodiment document archiving system.

The present invention provides a significant improvement over the prior art in that tens, hundreds or even thousands of documents can, in effect, be time stamped with the submission of but a single hash list file to an electronic time stamping authority. Since such electronic time stamping authorities tend to charge on a per document basis, the instant invention can provide significant savings. It is noted that when a large number of files are presented in the hash list file, the hash list file can become quite large. Additionally, an individual or company may not wish to disclose to the electronic time stamping authority 50 such a large list of file names. Hence, in an alternative embodiment, shown in FIG. 10, a document archiving system 400 does not send the hash list file 150 itself to the electronic time stamping authority. Instead, to obtain a digital time stamp for the hash list file 150, the document archiving system 400 performs an additional step of using the verification hash engine 130 to obtain a verification hash 410 of the hash list file 150. The verification hash 410 is then submitted to the electronic time stamping authority 50 to obtain the digital time stamp 160.

Figure 11:
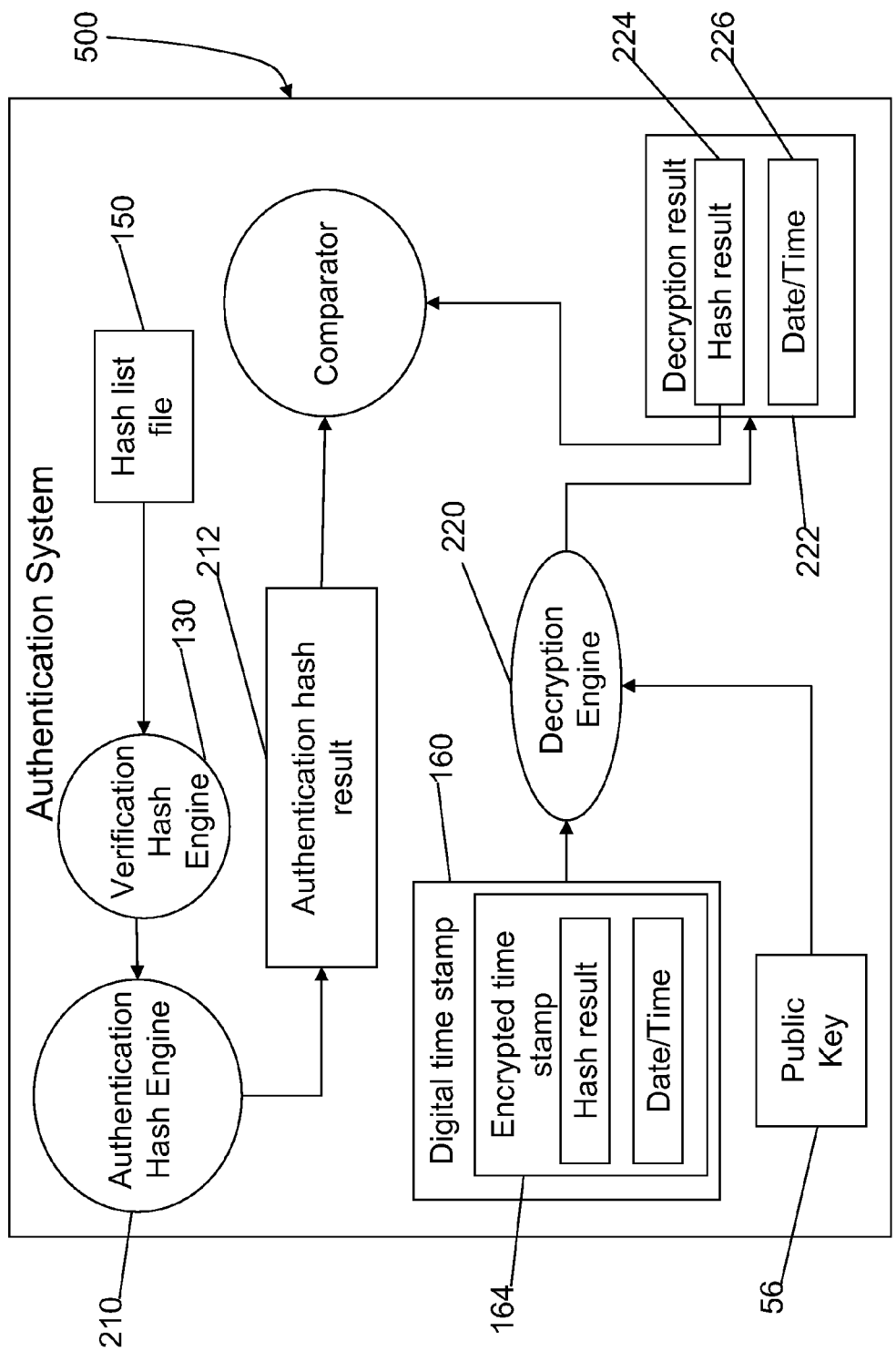
FIG. 11 illustrates another embodiment authentication system.

As in the previous embodiment, the digital time stamp 160 obtained by the document archiving system 400 above digitally time stamps the hash list file 150, when used with a suitably-adjusted authentication system 500, as depicted in FIG. 11. The authentication system 500 includes the additional step of first running the hash list file 150 to be authenticated through the verification hash engine 130, and then passing the result from the verification engine 130 into the authentication hash engine 210. The remaining steps of the authentication procedure remain the same.

Figure 2:
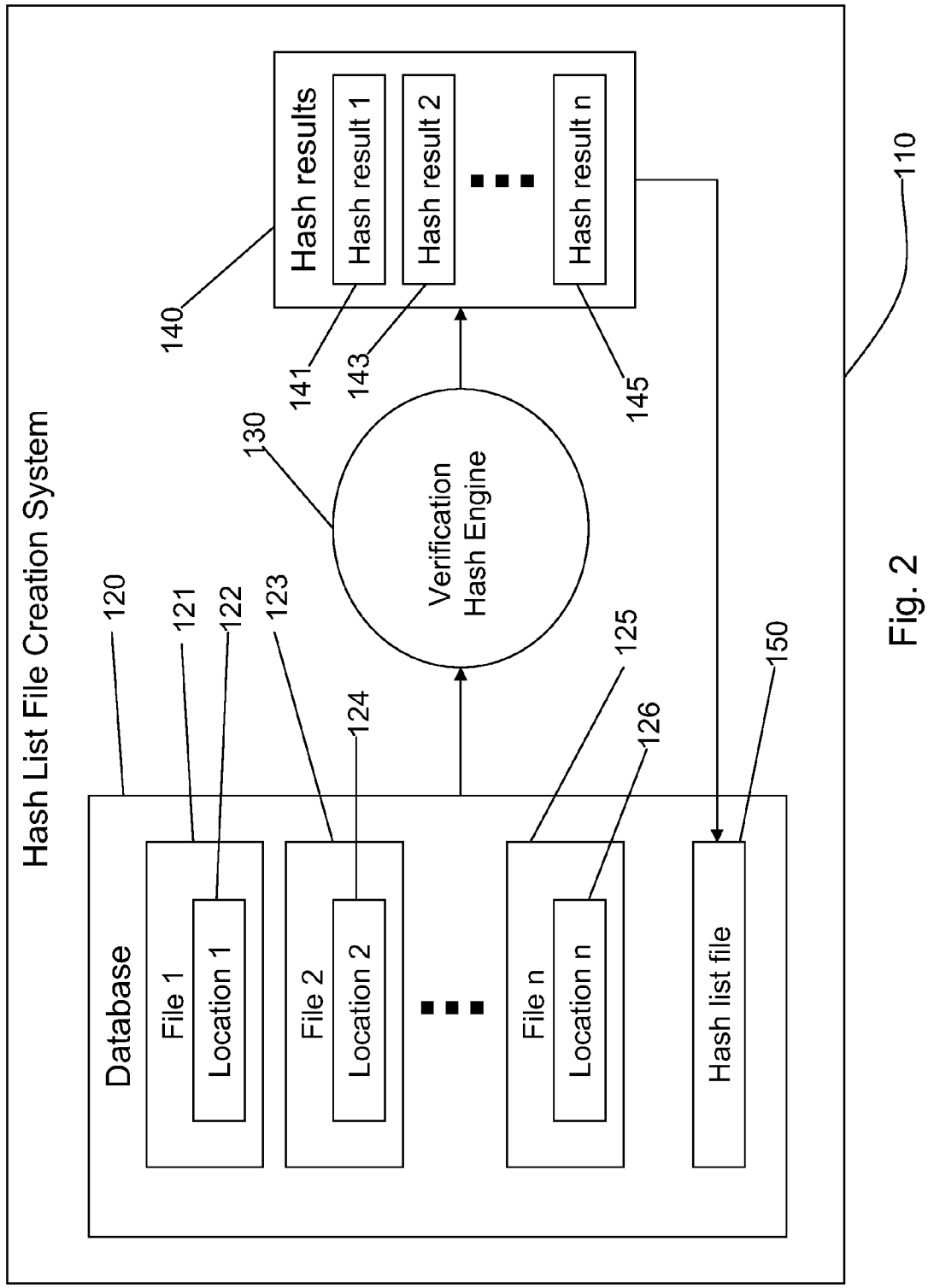
FIG. 2 shows an embodiment hash list file creation system.
Figure 3:
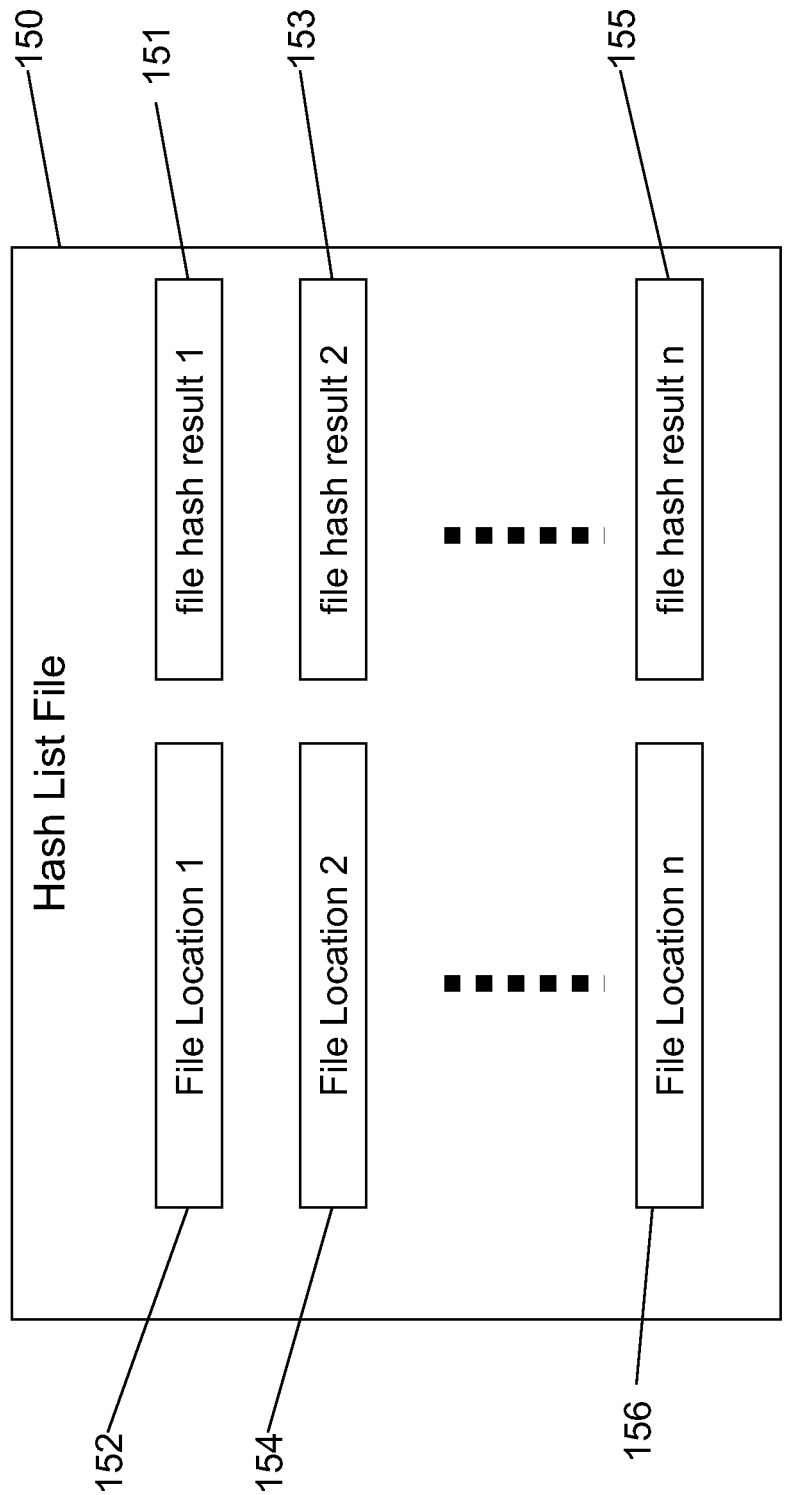
FIG. 3 shows one embodiment of a hash list file.
Figure 4:
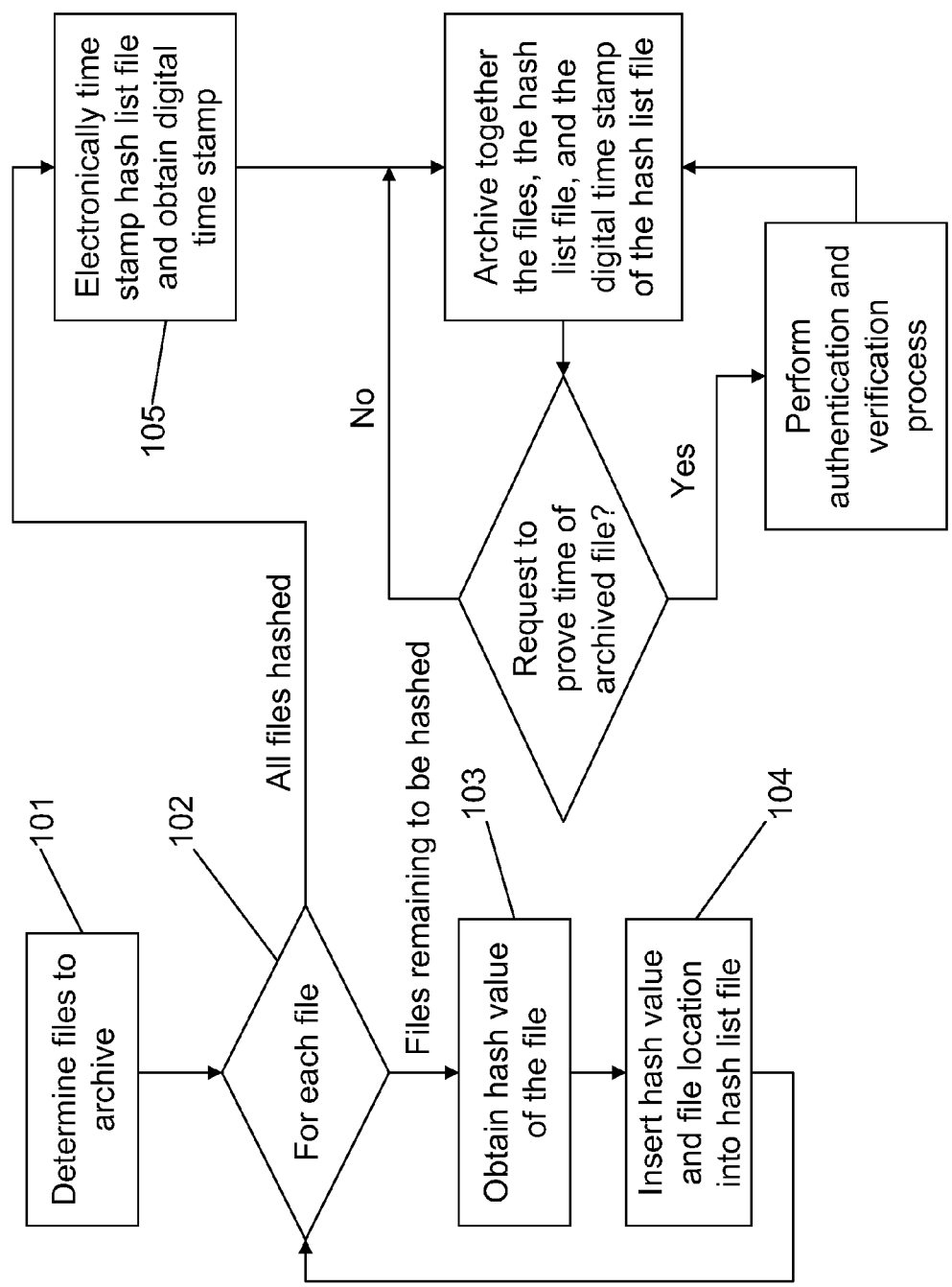
FIG. 4 is a flow chart of an embodiment document archiving and verification method.
Figure 5:
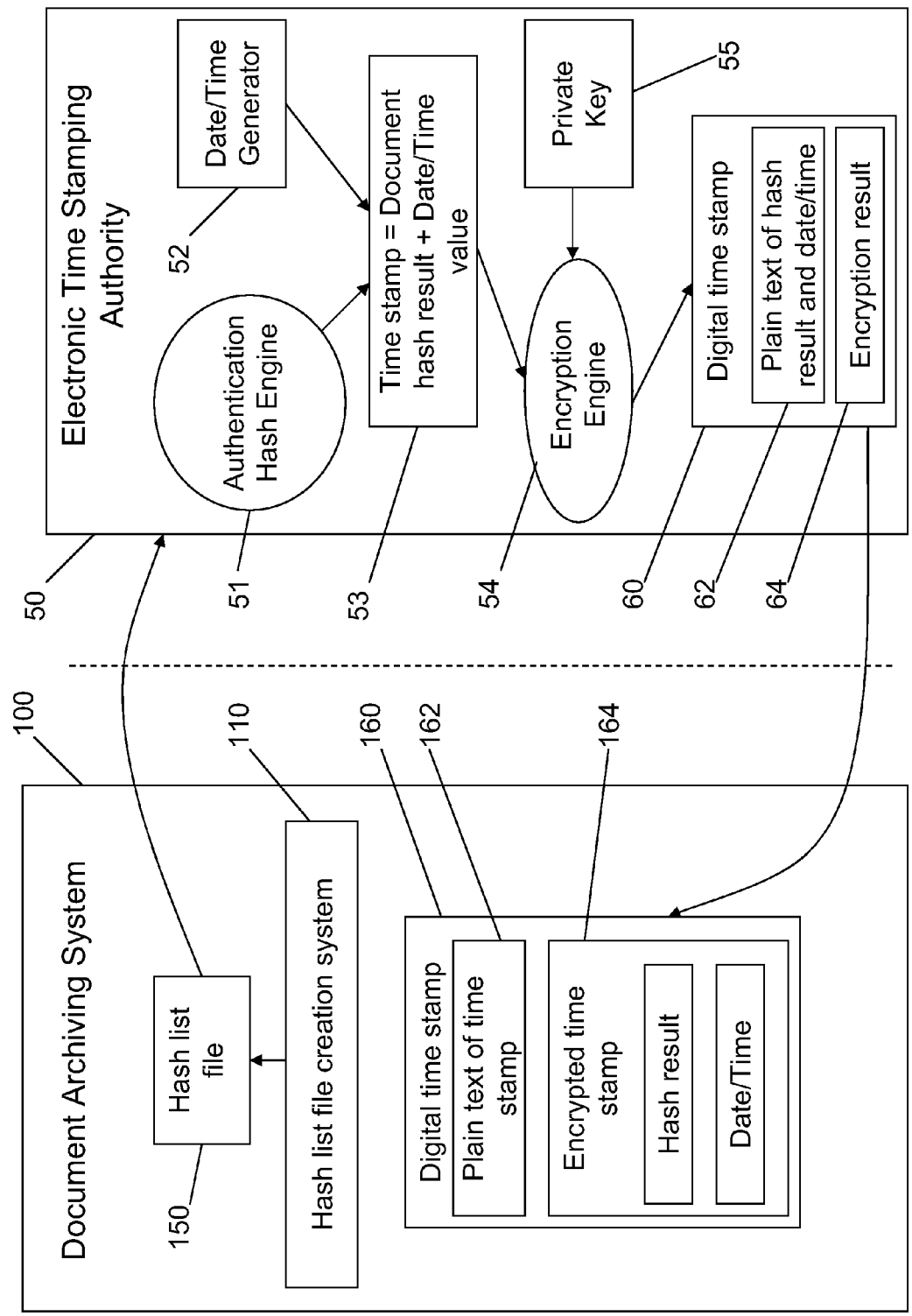
FIG. 5 illustrates an embodiment document archiving system obtaining a time stamp from an electronic time stamping authority.
Figure 12:
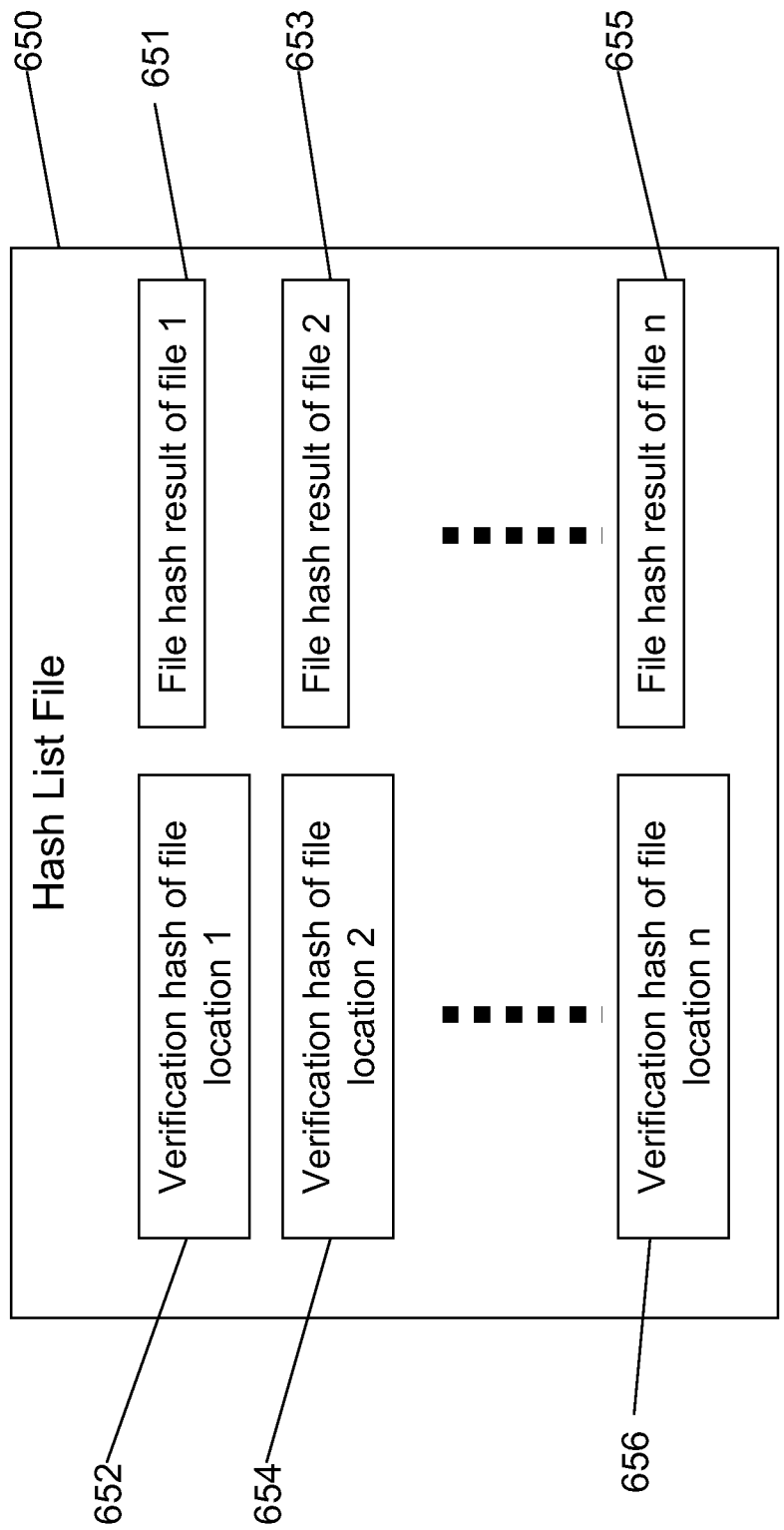
FIG. 12 shows another embodiment hash list file.

Finally, with reference to FIG. 12 in conjunction with FIG. 2, it should be noted that the file locations 122, 124, 126 themselves need not be placed within the hash list file. To avoid unnecessary disclosure of potentially sensitive information to the electronic time stamping authority 50, as shown in another embodiment hash list file 650, a verification hash of the file locations 652, 654, 656 may be substituted for the file locations 122, 124, 126. The verification hash engine 130 is thus called twice for each iteration through the loop as the archive files 121, 123, 125 are processed to build the hash list file 650: the electronic document 121, 123, 125 is submitted to the verification hash engine 130 to obtain the corresponding verification hash result 651, 653, 655; and the file location indicator 122, 124, 126 is submitted to obtain the respective verification hash of the file locator 652, 654, 656. The verification system 300 would thus scan the hash list file 650 for a verification hash of the location of the file of interest, rather than for the file locator itself. Other aspects of the verification system 300 would otherwise remain unchanged.

Although the invention herein has been described with reference to particular embodiments, it is to be understood that these embodiments are merely illustrative of the principles and applications of the present invention. For example, the order in which the verification and authentication procedures is carried out may be changed. An electronic document could first be verified as being unaltered, and then the hash list file for that electronic document could be authenticated. It should also be noted that although the verification hash engines and authentication hash engines are indicated as separate units, it will be appreciated that they could, in fact, implement the same function, and hence be the same unit. It is therefore to be understood that numerous modifications may be made to the illustrative embodiments and that other arrangements may be devised without departing from the spirit and scope of the present invention as defined by the following claims.

What is claimed is:

1. An electronic document management method comprising:
    generating, by a processor, a plurality of file hash results with a first hash function for a corresponding plurality of electronic documents;
    generating, by the processor, a hash list file comprising the plurality of file hash results and a plurality of corresponding locations in memory of the plurality of electronic documents;
    utilizing an electric time stamping authority to obtain a digital time stamp of the hash list file; and
    storing, in memory, the hash list file and the digital time stamp for a later verification step.

2. The method of claim 1 further comprising storing the electronic documents.

3. The method of claim 1 wherein the hash list file further comprises a plurality of location entries, each location entry derived from the location in memory of a corresponding one of the plurality of electronic documents.

4. The method of claim 3 wherein each location entry is a hash result of the location of the electronic document.

5. The method of claim 4 wherein the plurality of file hash results in the hash file list file are respectively associated with the location entries.

6. The method of claim 1 wherein the later verification step comprises:
    for a file to be verified, utilizing the first hash function to obtain a verification hash result; and
    comparing the verification hash result to a corresponding file hash result in the hash list file.

7. The method of claim 6 further comprising utilizing the digital time stamp to authenticate the hash list file.

8. The method of claim 6 wherein the file to be verified is at least one of the electronic documents.

9. The method of claim 1 wherein utilizing the electronic time stamping authority comprises submitting the hash file list to the electronic time stamping authority.

10. The method of claim 1 wherein utilizing the electronic time stamping authority comprises:
    utilizing a second hash function to obtain a submission hash result of the hash list file; and
    submitting the submission hash result to the electronic time stamping authority.

11. The method of claim 10 wherein the first hash function is functionally identical to the second hash function.

12. The method of claim 1 wherein the first ahs function is a cryptographic hash function.

13. The method of claim 1, wherein the electronic time stamping authority is a trusted electronic time stamping authority.

14. A computer-readable storage media comprising a document management program, the document management program comprising program code for performing the following steps:
    generating a plurality of file hash results with a first hash function for a corresponding plurality of electronic documents;
    generating a hash list file comprising the plurality of file hash results and a plurality of corresponding locations in memory of the plurality of electronic documents;
    utilizing an electronic time stamping authority to obtain a digital time stamp of the hash list file;
    for a file to be verified, utilizing the hash function to obtain a verification hash result; and
    comparing the verification hash result to a corresponding file hash result in the hash list file for the file to be verified.

15. The computer-readable storage media of claim 14 wherein the program code is further adapted to perform the step of utilizing the digital time stamp to authenticate the hash lists file.

16. The computer-readable storage media of claim 14 wherein the file to be verified is at least one of the electronic documents.

* * * * *